United States Patent
Kim et al.

(10) Patent No.: US 10,756,794 B2
(45) Date of Patent: Aug. 25, 2020

(54) METHOD FOR REPORTING CHANNEL QUALITY INFORMATION IN DISTRIBUTED ANTENNA COMMUNICATION SYSTEM AND APPARATUS THEREFOR

(71) Applicant: LG ELECTRONICS INC., Seoul (KR)

(72) Inventors: Heejin Kim, Seoul (KR); Jiwon Kang, Seoul (KR); Heejeong Cho, Seoul (KR); Genebeck Hahn, Seoul (KR); Ilmu Byun, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/091,940

(22) PCT Filed: Oct. 17, 2016

(86) PCT No.: PCT/KR2016/011618
§ 371 (c)(1),
(2) Date: Oct. 5, 2018

(87) PCT Pub. No.: WO2017/175937
PCT Pub. Date: Oct. 12, 2017

(65) Prior Publication Data
US 2019/0097701 A1    Mar. 28, 2019

Related U.S. Application Data

(60) Provisional application No. 62/319,300, filed on Apr. 7, 2016.

(51) Int. Cl.
*H04B 7/0456* (2017.01)
*H04L 1/00* (2006.01)
(Continued)

(52) U.S. Cl.
CPC ........... *H04B 7/0486* (2013.01); *H04B 7/022* (2013.01); *H04B 7/0404* (2013.01);
(Continued)

(58) Field of Classification Search
CPC ... H04L 5/0023; H04L 5/0007; H04B 7/0413; H04B 7/08; H04B 7/0404; H04W 72/042
See application file for complete search history.

(56) References Cited

U.S. PATENT DOCUMENTS

| | | | |
|---|---|---|---|
| 2006/0250941 A1* | 11/2006 | Onggosanusi | H04B 7/0691 370/208 |
| 2009/0238144 A1* | 9/2009 | Cave | H04W 36/18 370/331 |

(Continued)

FOREIGN PATENT DOCUMENTS

| | | | | |
|---|---|---|---|---|
| WO | 2011050840 | | 5/2011 | |
| WO | WO2011050840 | * | 5/2011 | ............ H04W 84/00 |
| WO | 2013187740 | | 12/2013 | |

OTHER PUBLICATIONS

PCT International Application No. PCT/KR2016/011618, Written Opinion of the International Searching Authority dated Feb. 2, 2017, 22 pages.

*Primary Examiner* — Christopher M Crutchfield
(74) *Attorney, Agent, or Firm* — Lee, Hong, Degerman, Kang & Waimey

(57) ABSTRACT

Disclosed herein is a method for reporting channel state information to a base station by a terminal having distributed antenna units in a wireless communication system. Specifically, the method for reporting channel state information comprises the steps of: receiving a reference signal from the base station; and reporting multi-channel state information on the basis of the reference signal, wherein the multi-channel state information includes a channel quality indicator for each of the distributed antenna units.

5 Claims, 10 Drawing Sheets

(a)

(b)

(51) Int. Cl.
  *H04B 7/022* (2017.01)
  *H04B 7/0404* (2017.01)
  *H04B 7/0413* (2017.01)
  *H04B 7/08* (2006.01)
  *H04L 5/00* (2006.01)

(52) U.S. Cl.
  CPC ............ *H04B 7/0413* (2013.01); *H04B 7/08* (2013.01); *H04L 1/00* (2013.01); *H04L 5/0007* (2013.01); *H04L 5/0048* (2013.01); *H04L 5/0057* (2013.01)

(56) References Cited

U.S. PATENT DOCUMENTS

| | | | |
|---|---|---|---|
| 2010/0009636 A1 | 1/2010 | Hasegawa | |
| 2010/0234071 A1 | 9/2010 | Shabtay et al. | |
| 2010/0271970 A1* | 10/2010 | Pan | H04L 1/0026 370/252 |
| 2011/0249629 A1* | 10/2011 | Ko | H04B 7/0417 370/329 |
| 2015/0195025 A1 | 7/2015 | Kang et al. | |
| 2017/0359811 A1* | 12/2017 | Yamada | H04L 5/005 |
| 2018/0205432 A1* | 7/2018 | Kim | H04B 7/06 |
| 2018/0331736 A1* | 11/2018 | Lidian | H04B 7/0486 |

\* cited by examiner

FIG. 2
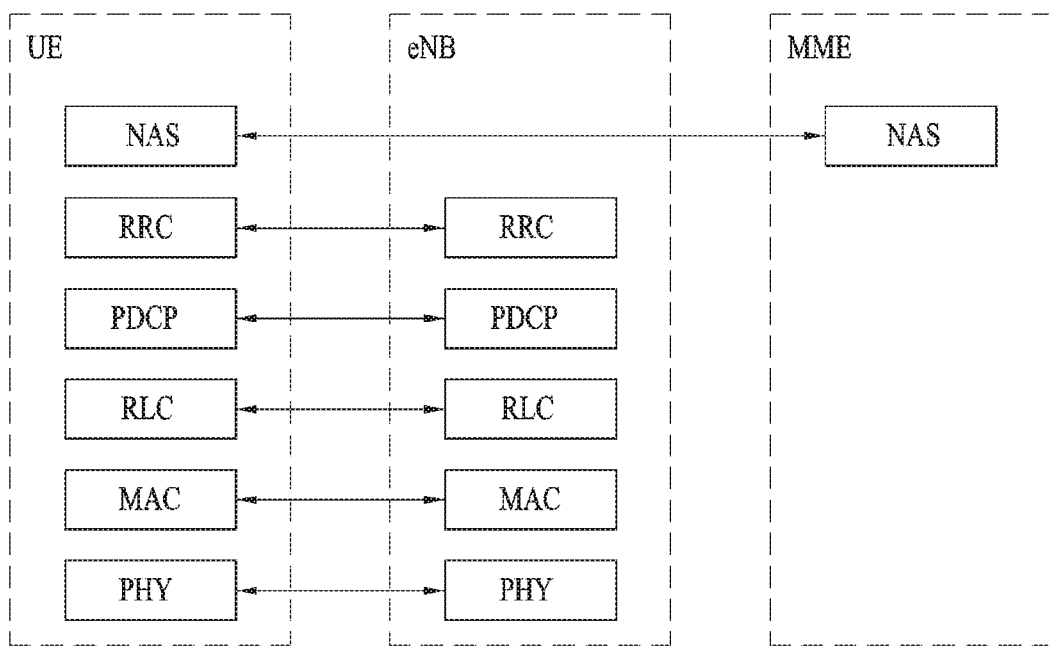
(A) CONTROL-PLANE PROTOCOL STACK
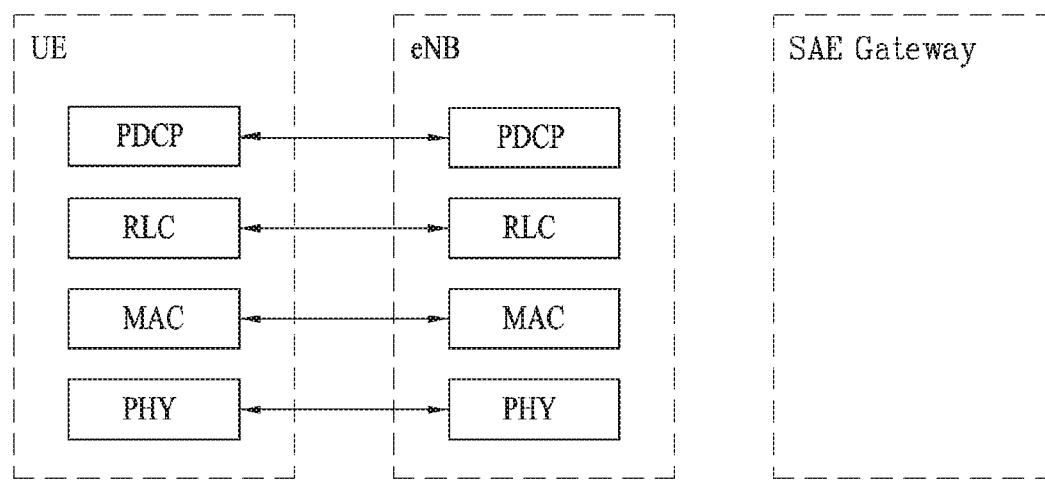
(B) USER-PLANE PROTOCOL STACK

METHOD FOR REPORTING CHANNEL QUALITY INFORMATION IN DISTRIBUTED ANTENNA COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/011618, filed on Oct. 17, 2016, which claims the benefit of U.S. Provisional Application No. 62/319,300, filed on Apr. 7, 2016, the contents of which are all hereby incorporated by reference herein in their entirety.

TECHNICAL FIELD

The present invention relates to a wireless communication system, and more particularly, to a method of reporting channel quality information in a distributed antenna communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the technical task of the present invention is to propose a method of reporting channel quality information in a distributed antenna communication system and apparatus therefor.

Technical Solutions

In one technical aspect of the present invention, provided herein is a method of reporting channel status information to a base station by a user equipment having distributed antenna units in a wireless communication system, the method including receiving a reference signal from the base station and reporting multi-channel status information based on the reference signal, wherein the multi-channel status information includes a channel quality indicator for each of the distributed antenna units.

Here, the multi-channel status information may include a single rank indicator for the user equipment and a single precoding matrix index for the user equipment. Or, the multi-channel status information may include a rank indicator for each of the distributed antenna units and a precoding matrix index for each of the distributed antenna units.

Preferably, the method may further include transmitting information on distributed antenna unit indexes to the base station. In this case, the multi-channel status information may include the distributed antenna unit index corresponding to the channel quality indicator.

More preferably, the method may further include receiving distributed antenna unit-specific downlink resource allocation information from the base station.

Additionally, in another technical aspect of the present invention, provided herein is a user equipment in a wireless communication system, the user equipment including a plurality of distributed antenna units and a central unit controlling the distributed antenna units, wherein the central unit is configured to create and report multi-channel status information to the base station based on a reference signal received from the base station and wherein the multi-channel status information includes a channel quality indicator for each of the distributed antenna units.

In further technical aspect of the present invention, provided herein is a method of measuring an uplink channel of a used equipment having distributed antenna units by a base station in a wireless communication system, the method including receiving a sounding reference signal per distributed antenna unit from the user equipment, calculating a channel quality indicator per distributed antenna unit based on the sounding reference signal, selecting at least one of the distributed antenna units using the channel equality indicator per distributed antenna unit, and transmitting information on the selected distributed antenna unit and an uplink grant for the selected distributed antenna unit to the user equipment.

Particularly, the method may further include receiving information on the distributed antenna units from the user equipment, and the information on the selected distributed antenna unit may include an index of the selected distributed antenna unit.

Advantageous Effects

According to an embodiment of the present invention, channel quality information can be efficiently reported in a distributed antenna communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE FOR INVENTION

Figure 1:
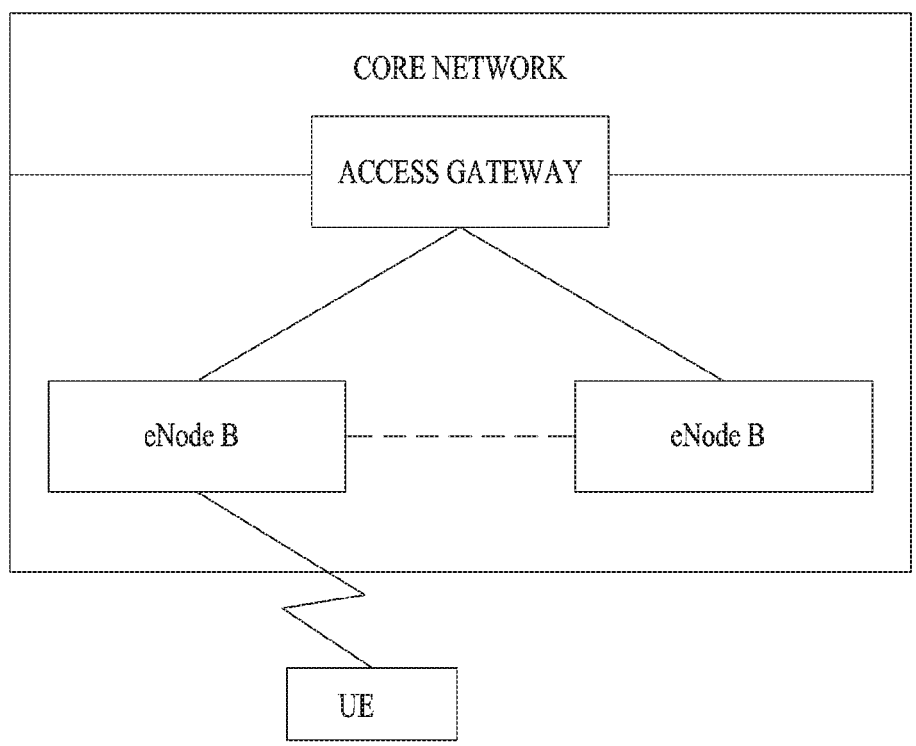
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

In addition, in the present specification, the term "base station" may include a remote radio head (RRH), an eNB, a transmission point (TP), a reception point (RP), a relay, etc.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

A single cell configuring a base station (eNB) provides a downlink or uplink transmission service to several UEs by being set to one of bandwidths such as 1.25 Mhz, 2.5 Mhz, 5 Mhz, 10 Mhz, 15 Mhz, 20 Mhz and the like. Different cells may be configured to provide different bandwidths, respectively.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
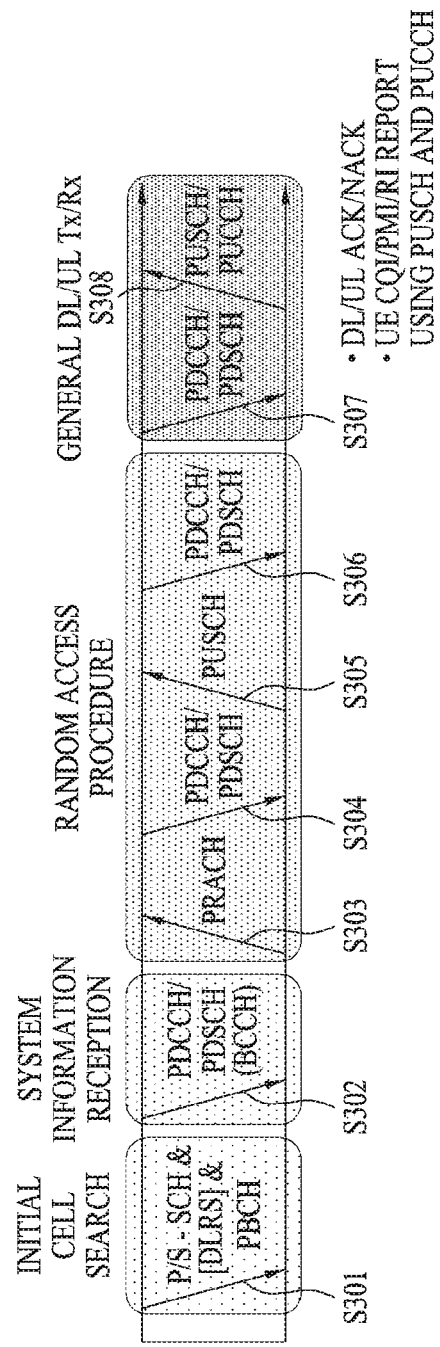
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
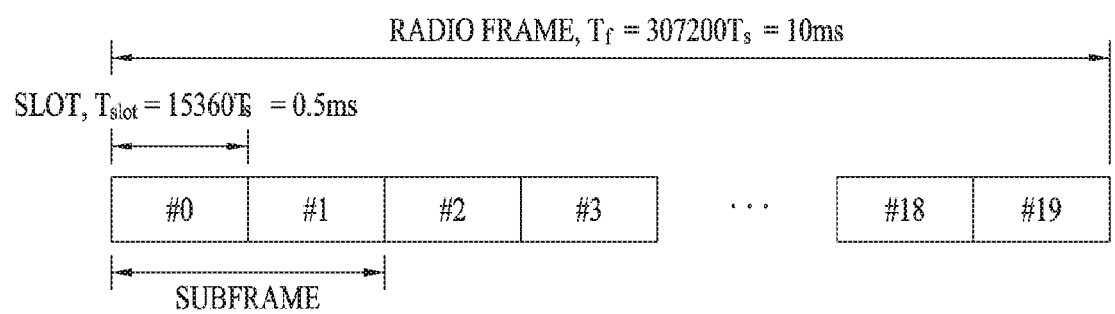
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
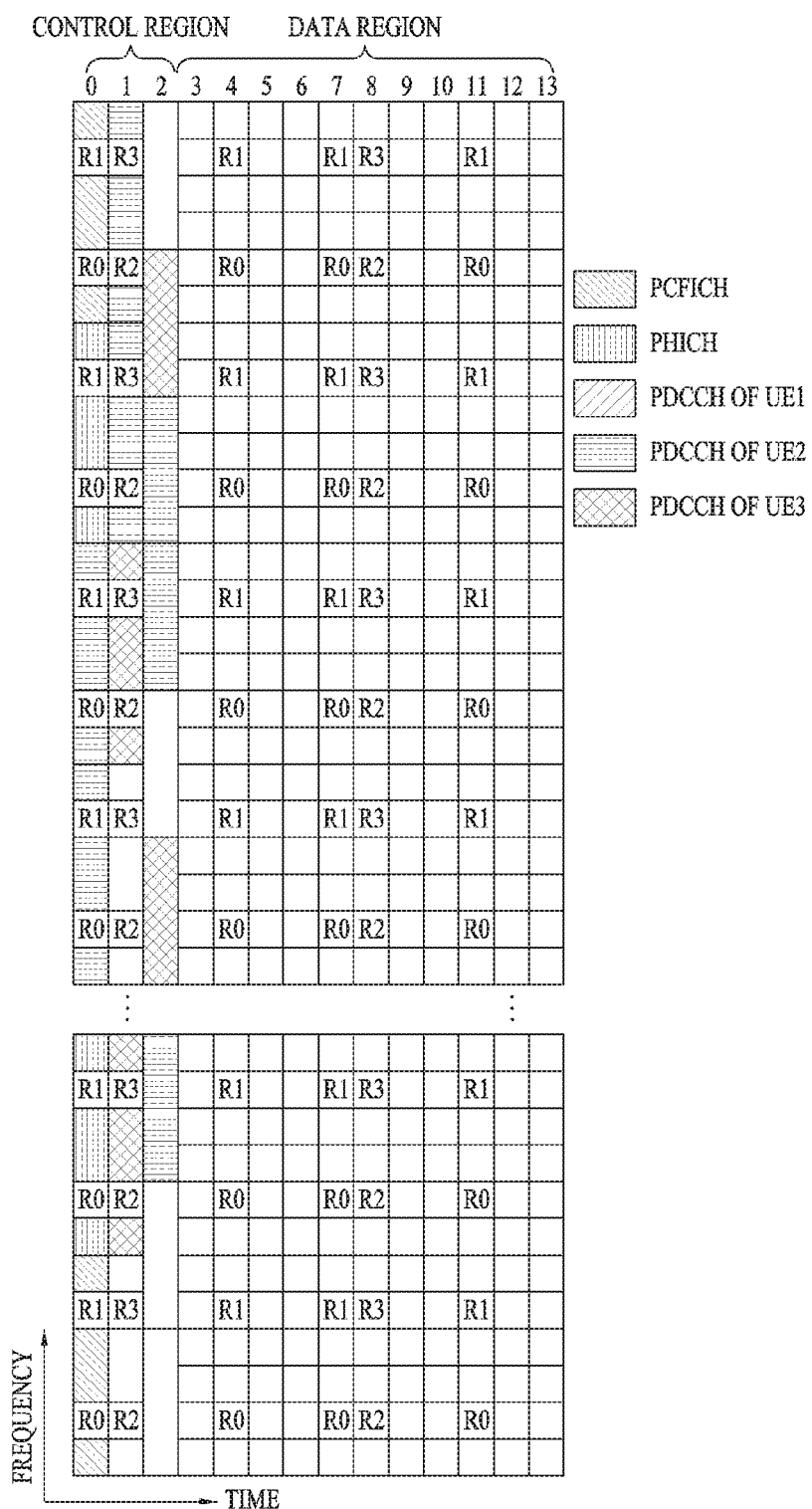
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
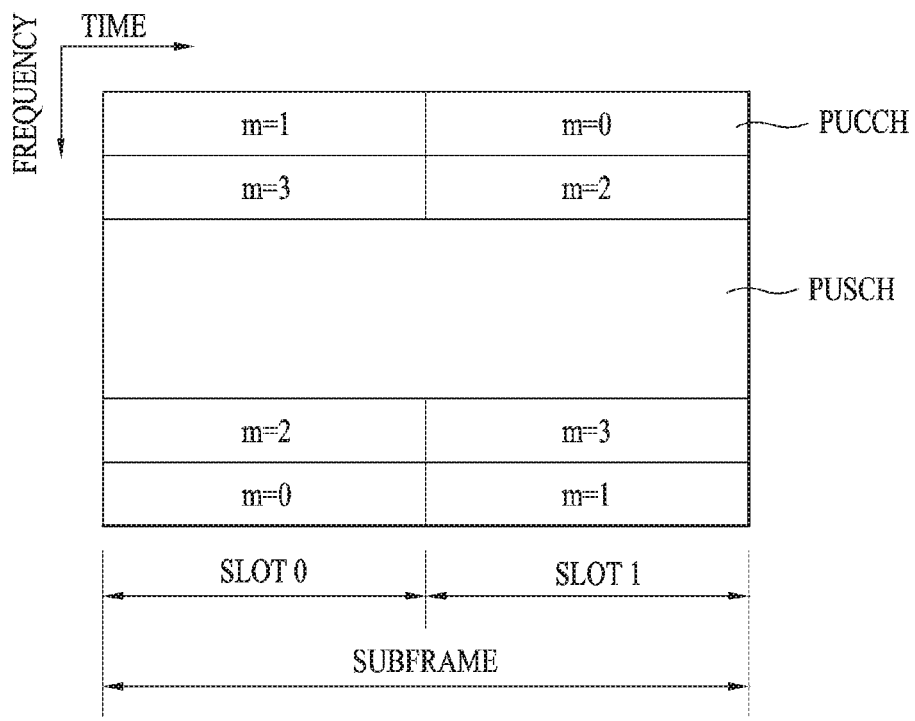
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 7:
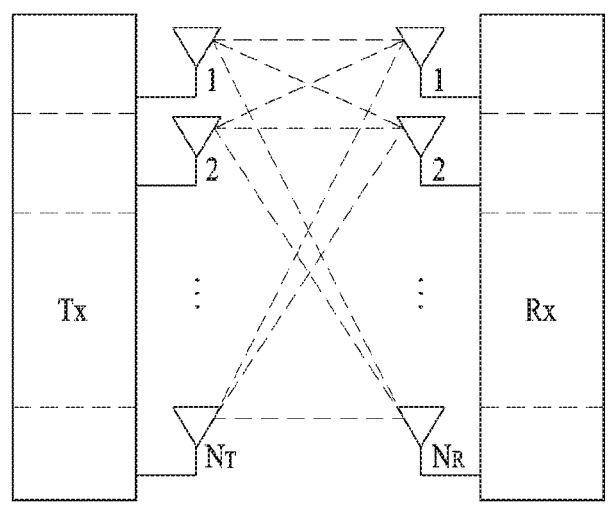
FIG. 7 is a diagram showing the configuration of a general multiple input multiple output (MIMO) system.

The configuration of the general multi-antenna (MIMO) communication system is shown in FIG. 7. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$. Here, $R_i$ is the smaller of the two values $N_T$ and $N_R$.

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

Hereinafter, measurement and reporting of Channel Status Information (CSI) are described.

In order for a transmitting (Tx) end to generate a beam suitable for signal reception of a receiving (Rx) end, the Tx end should obtain information on a channel between the Tx end and the Rx end and accurately measure a suitable beam and a gain in case of using the beam based on the obtained information. The channel information may be measured in a manner that the Rx end transmits a separate pilot signal to the Tx end. Yet, in case of the current mobile communication, an Rx end measures a channel and then reports CSI thereof. In case of the aforementioned MIMO system implementation, a channel can be defined as a combination of subchannels generated between a multitude of Tx and Rx antennas. If the number of antennas used for the MIMO system implementation increases, complex forms are provided. Depending on a scheme of measuring and reporting the channel information, there are an explicit CSI reporting scheme and an implicit CSI reporting scheme.

The explicit CSI reporting scheme is a scheme that an Rx end reports information maximally approximate to a measurement value to a Tx end without interpretation of a measured channel, and various schemes (e.g., quantization of MIMO channel represented as a matrix form, Singular Value Decomposition (SVD) operation of the MIMO channel, etc.) for reducing signaling overhead used for CSI reporting are applied. The implicit CSI reporting scheme is a scheme that an Rx end selects and reports contents substantially necessary for beam generation from a Tx end by interpreting channel information instead of information on a measured channel Since the implicit CSI reporting scheme has an advantage that signaling overhead consumed for CSI reporting is smaller than that of the explicit CSI reporting scheme, it is used for a current mobile communication system.

In most of cellular systems including LTE system, a UE calculates CSI by receiving a pilot or reference signal for channel estimation from a base station and then reports it to the base station. Based on CSI information fed back from the UE, the base station transmits a data signal. CSI information fed back by a UE in LTE system includes Channel Quality Information (CQI), Precoding Matrix Index (OMI), and Rank Indicator (RI).

CQI feedback is radio channel quality information reported for the purpose of providing a guide indicating whether a base station applies a prescribed Modulation and Coding Scheme (MCS) in transmitting data, i.e., for the purpose of link adaptation. If a channel quality between a base station and a UE is high, the UE feeds back a high CQI value so that the base station will transmit data by applying a relatively high modulation order and a relatively low coding rate. On the contrary, the UE feeds back a low CQI value so that the base station will transmit data by applying a relatively low modulation order and a relatively high coding rate.

In case that a base station installs multiple antennas, PMI feedback is the information provided to the base station for the purpose of providing a guide about whether to apply a precoder. A UE estimates a Downlink (DL) channel between the base station and the UE from a reference signal and then recommends what kind of a precoder is preferably applied by the base station through the PMI feedback. In LTE system, a linear precoder expressible in matrix form for PMI configuration is considered only. The base station and the UE share a codebook configured with a multitude of precoding matrixes, and each of the precoding matrixes has a unique index in the codebook. Hence, the UE feeds back an index corresponding to a most preferred precoding matrix in the codebook, thereby minimizing a feedback information amount of its own.

As a base station and a UE install multiple antennas, if multi-layer transmission through spatial multiplexing is possible, RI feedback is the information on the number of preferred layers provided to the base station for the purpose of providing a guide about the number of Tx layers preferred by the UE. RI has close relationship with PMI. This is because the base station should be aware which precoder needs to be applied to each layer according to the number of layers. In PMI/RI feedback configuration, after a PMI codebook has been configured with reference to single layer transmission, PMI is defined per layer and then fed back. Yet, such a scheme has a disadvantage that a PMI/RI feedback information amount increases considerably according to an increase of the number of Tx layers. Hence, in LTE system, a PMI codebook according to each Tx layer number is defined. Namely, for R-layer transmission, N matrixes in size of $N_t \times R$ are defined in a codebook. Here, R is the number of layers, $N_t$ is the number of Tx antenna ports, and N is a size of a codebook. Hence, in LTE system, a size of a PMI codebook is determined irrespective of the number of layers. Thus, since the layer number R matches a rank value of a precoding matrix eventually, a term 'RI' is used.

A vehicle-to-vehicle communication system is described on the basis of the aforementioned wireless communication system as follows.

Figure 8:
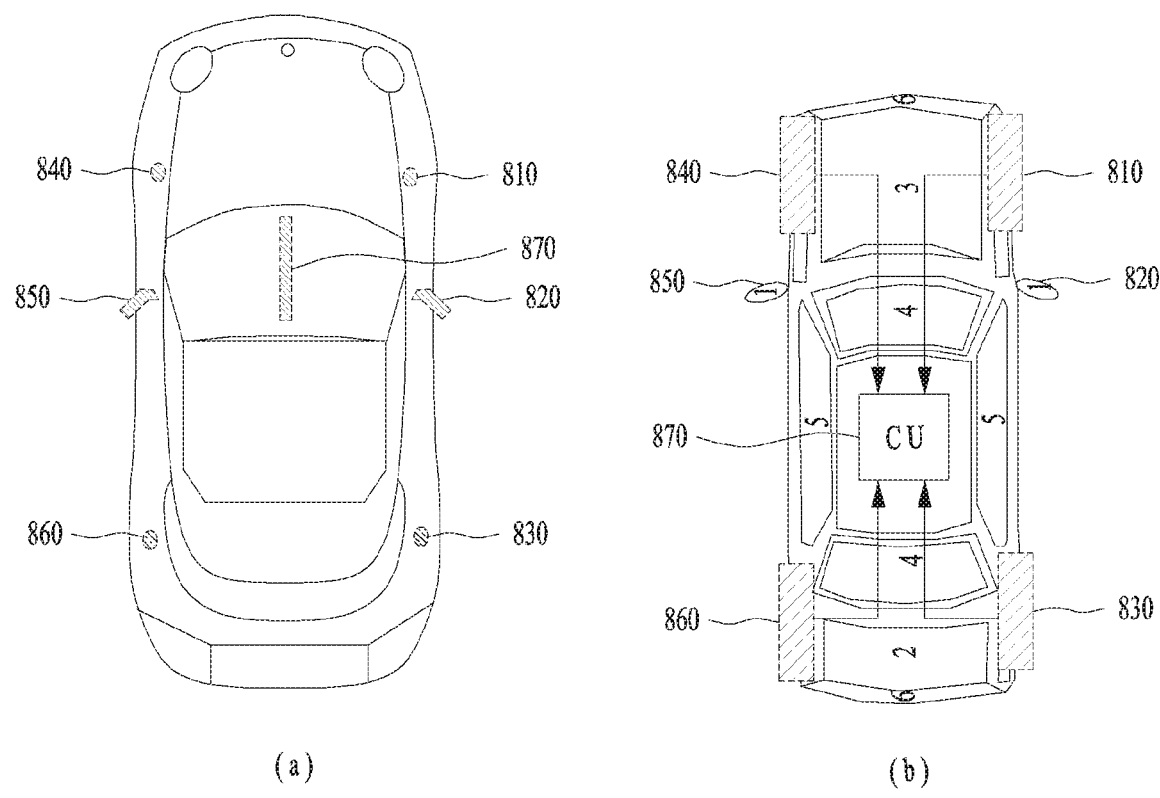
FIG. 8 is a diagram showing a vehicle including a multitude of antenna arrays.

FIG. 8 is a diagram showing a vehicle including a multitude of antenna arrays. The use frequency and the utilization service category of the aforementioned wireless communication system are increasing. Here, the needs for intending to support high Quality of Service (QoS) together with high data throughput or high data rate to a UE or user moving fast unlike the conventional static service are increasing.

For example, in a wireless communication system, the necessity for supporting a wireless service of good quality to currently moving UEs (e.g., a case that a multitude of UEs or users (hereinafter commonly called 'UEs') using public transportation desire to watch multimedia on board, a case that a multitude of UEs on a personal vehicle currently driven on a highway use different wireless communication services, etc.) is increasing.

Yet, the existing wireless communication system may have some limitation put on providing a service to a UE in consideration of fast moving or mobility. In this case, in order to support a service, a system network needs to be improved revolutionarily. Moreover, a new system design may be necessary in a scope of not affecting the existing network infrastructure while maintaining compatibility with the existing network infrastructure.

For example, as a large-size antenna array is installed in a vehicle, the vehicle is made to obtain a large array gain. Hence, despite that the vehicle is moving fast, UEs in the vehicle can be supported with services of good quality. In the vehicle, data received through a Central Unit (CU) can be relayed to UEs in the vehicle. In doing so, in case of using a large-size antenna array, the vehicle can prevent communication performance degradation due to penetration loss having an average value of about 20 dB. Moreover, as the vehicle uses a number of Receiving (Rx) antennas in comparison with the number of UEs using the system, large array gain securement can be facilitated and Rx diversity can be secured through securement of distance between Rx antennas. Namely, through the aforementioned vehicle-to-vehicle MIMO system, it is possible to provide a service to a fast-moving UE without additional design of a network.

Yet, despite the above-mentioned advantages, it is still difficult to apply the vehicle-to-vehicle MIMO system due to vehicle's exterior and manufacturing system establishment and the like. And, since a vehicle is a considerably expensive equipment in comparison with an existing personal portable communication device, it may be difficult to upgrade and update the vehicle. Moreover, more requirements such as design concept, aerodynamic structure and the like as well as communication performance should be met for the vehicle, limitations may be put on aesthetic/aerodynamic vehicle design. For example, in order to eliminate visual inconvenience provided by present antennas, some vehicle manufacturers commonly use a combination antenna of which performance is lower than that of a single antenna.

Yet, in an environment that the development and necessity of a communication system are on the rise, in order to resolve the spatial limitation of a large-size antenna array, a distributed antenna array system for multiple antenna array system implementation tends to be employed gradually and applied in consideration of harmony with a vehicle exterior and the like.

For example, referring to FIG. 8, a plurality of antennas 810, 820, 830, 840, 850 and 860 may be installed in a vehicle. Here, locations and number of a plurality of the antennas 810, 820, 830, 840, 850 and 860 and the like may vary depending on a vehicle design system and each vehicle. Here, the configuration described in the following is identically applicable despite the locations and number of a plurality of the antennas 810, 820, 830, 840, 850 and 860 installed in the vehicle are changed, and non-limited by the following embodiment. Namely, such configuration is applicable to antennas having various shapes and radiation patterns according to the locations of a plurality of the antennas 810, 820, 830, 840, 850 and 860.

In this case, signals for antennas (Distributed antenna Units (DUs) or Remote Units (RUs)) distributively disposed in the vehicle can be controlled through a Central control Unit (CU) 870. Namely, the CU 870 of the vehicle controls signals for the RUs 810, 820, 830, 840, 850 and 860 installed in the vehicle, thereby receiving a signal from a base station by maximizing reception diversity and also preventing a radio access between the base station and the vehicle from being disconnected in a fast moving situation. Namely, the vehicle itself may be a single UE having a plurality of antennas or a relay UE relaying signals. The vehicle can provide services of good quality to a plurality of UEs in a vehicle through control and relay of a signal received through the CU 870.

Figure 9:
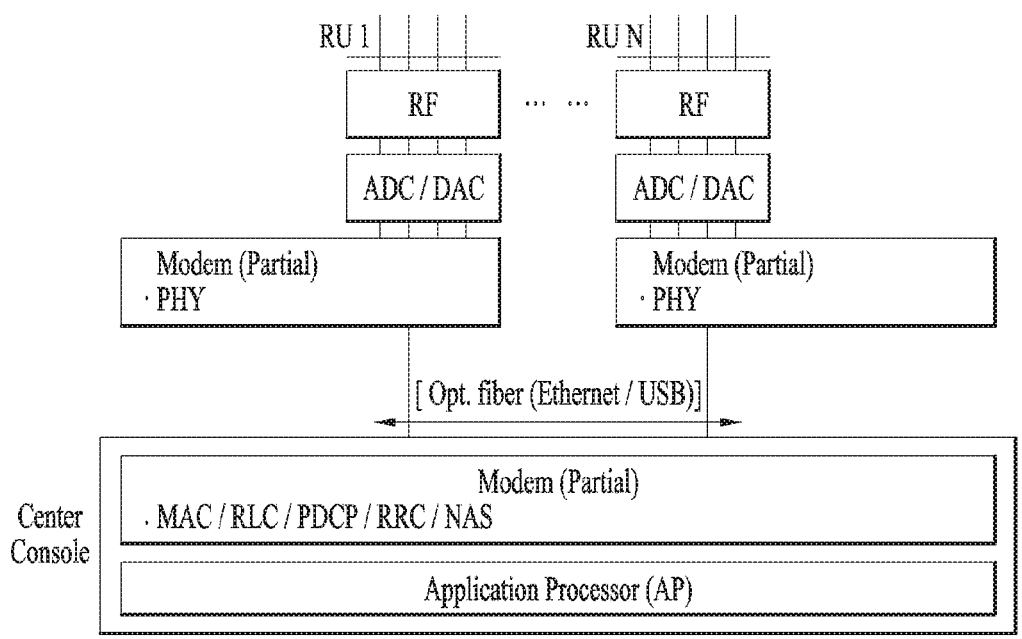
FIG. 9 is a diagram showing an example of apportionment of functions between DU and CU in a vehicle MIMO system.

Generally, in functional/hierarchical aspect of communication, a UE includes RRH including a Radio Frequency (RF) module and Analog Digital Converter/Digital Analog Converter (ADC/DAC), Modem (PHY, MAC, RLC, PDCP, RRC, and NAS included), and Application Processor (AP). The function of a part named DU in the vehicle distributed antenna system has no reason to be limited to only playing a role as an antenna (RF or RRH) module frequently called in function/layer of the UE. Namely, a specific processing can be performed by additionally giving some of functions of the UE to each DU as well as the function of the RF module and a signal through the processing can be brought to the CU from the DU so as to be combined. Therefore, in case of a vehicle antenna system, by appropriately distributing and assigning function/layer modules to the DU and the CU, it is able to obtain implementations gains such as lowering level of difficulty in RF implementation (according to a DU-CU implementation scenario) or resolving a DU-CU cabling issue and the like. In the implementation scenario according to the DU-CU function/layer module distribution, one example of implementation that each DU includes the minimum function of a modem, e.g., a function of a Physical (PHY) layer can be illustrated as FIG. 9.

Through a vehicle distributed antenna system, a vehicle, i.e., a UE can obtain a DL performance gain in comparison with an existing UE through the two kinds of schemes (or, combination of two schemes) as follows.

1. Method of increasing reliability in a manner of receiving the same information (layer) from two or more DUs and then combining reception results of the respective DUs from the same information in CU 2. Method of increasing data throughput in a manner that DUs having large channel orthogonality receives different informations (layers), respectively According to the above-described vehicle MIMO system, depending on differences in antenna gain and beam pattern between different RUs disposed in a vehicle or a difference in RU disposed location, although the same preferred beam direction is selected in the same vehicle, definitely different actual DU Rx signal power may be measured actually. For example, an antenna installed at a top end of a vehicle roof is examined as obtaining a 3.4 dB Rx signal power gain in comparison with an antenna installed at a bottom end of a vehicle trunk. In case that an antenna is provided within a vehicle, it is already known that shield loss due to vehicle glass medium is considerable.

Therefore, in case of a vehicle UE having a distributed antenna technology applied thereto, required is a new CSI reporting scheme considering a per-RU Rx signal power difference, which is differentiated from the existing cellular UE's CSI reporting scheme of reporting a single PMI/CQI/RI set to a base station. Hence, the present invention proposes that channel status information is configured in consideration of a per-RU channel state (e.g., Rx power quality difference).

Particularly, CSI reported to a base station by a vehicle UE having a distributed antenna technology applied thereto is configured in a manner of including CQIs corresponding to a plurality of RUs and/or information on an identifier of a corresponding RU (e.g., an RU index defined in advance between a base station and a vehicle UE) according to the number of the installed RUs. Namely, CSI information configuration of a vehicle distributed antenna UE includes a single PMI/RI and a plurality of CQIs and may additionally include an RU index corresponding to each CQI, whereas configuration of channel status information reported to a base station by an existing UE is a PMI/CQI/RI set.

In case of a general UE, it is enough to report a single CQI to a base station. Yet, in case of a distributed antenna technology applied vehicle UE, Rx signal power may appear differently per RU depending on differences of RUs in antenna gain and beam pattern or an RU disposed location. Hence, channel information of each RU can be reported in detail to the base station in a manner that all CQIs of individual RUs calculated on the basis of measurement at each RU under a single PMI/RI are reported to the base station.

Yet, it is not mandatory to report CQIs for all RUs to a base station in the CSI information configuration of the present invention. Some CQIs may be reported to the base station under circumstances. In this case, each DL grant is not transmitted to an individual RU of a vehicle UE but an integrated DL grant is downloaded to the whole vehicle UE. For example, a vehicle UE selectively reports a minimum or maximum value among per-RU CQIs and then receives an integrated DL grant.

In such a case, if the base station applies MCS for a minimum CQI value, it means that data decoding is possible in every RU. Hence, when the base station sends data that should satisfy Ultra-Reliability Low Latency Communication (URLLC), it is able to apply an integrated DL grant. On the other hand, if the base station applies MCS for a maximum CQI value, it means that only an RU having a best CQI can perform data decoding. Hence, the base station is able to apply an integrated DL grant for large-scale communication.

Like the above-described example, as CQIs at a plurality of RUs are reported to a base station, it is possible to operate a transmission mode differently according to a Tx data (service) attribute.

Meanwhile, regarding a vehicle UE having a distributed antenna technology applied thereto, although a base station can recognize that a corresponding vehicle is a UE having a plurality of RUs, the corresponding vehicle may be implemented to be recognized as a general UE on a network. In this case, since it is impossible to give a substantial UE-ID such as C-RNTI to an individual RU, in order to represent that a currently reported CQI is information of a prescribed RU in CQI reporting of each RU, a vehicle UE can report a corresponding RU index (an arbitrary value agreed within the vehicle UE) together with CQI of each RU. Or, without an additional reporting of an RU index, when a UE makes a CSI reporting to a base station, it is agreed in advance that CQI of a specific RU is to be reported at a specific timing or a method of signaling the CQI by higher layer signaling such as RRC signaling may be applicable.

Moreover, as described above, unlike a scheme that a representative RU or CU makes a vehicle UE integrated CSI report by gathering CQI informations on the respective RUs, it is possible for each RU to make a CSI report. In this case, some RUs, i.e., a representative RU reports a single PMI/RI/CQI set to a base station like the existing UE and the rest of RUs may report CQI only. Thus, whether a representative RU makes a CSI report on a single vehicle UE as an integrated CSI report or each RU makes such a report independently can be selectively operated. And, it is able to consider adding a flag, which relates to an operation in one of the two modes, in making a CSI report.

Figure 10:
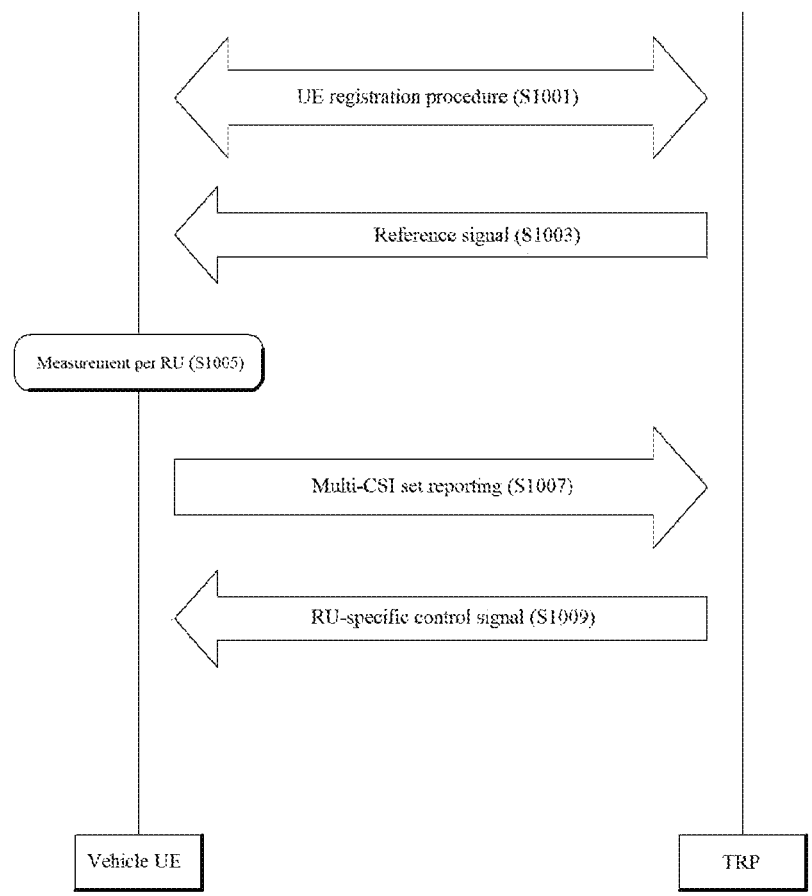
FIG. 10 shows an example that a vehicle UE having a distributed antenna applied thereto reports downlink channel information according to an embodiment of the present invention.

FIG. 10 shows an example that a vehicle UE having a distributed antenna applied thereto reports downlink channel information according to an embodiment of the present invention.

Referring to FIG. 10, in a step 1001, a vehicle UE and a Transmission and Reception Point (TRP), i.e., a base station perform a UE registration procedure. Particularly, through the UE registration procedure after the setup of connection with the TRP, the vehicle UE can provide the TRP with information indicating that the vehicle UE is a distributed multi-antenna UE and multi-antenna configuration information (e.g., number of RUs, per-RU antenna port configuration, number of antennas per RU, RU index, etc.).

Subsequently, the vehicle UE receives a reference signal from the TRP in a step 1003 and then performs per-RU CSI measurement in a step 1005. Then, the vehicle UE can report a multi-CSI set configured with PMI, RI and CQI per RU and a corresponding RU index to the TRP in a step 1007. Of course, as described above, the multi-CSI set is not configured with PMI and RI per RU but may be configured with a single PMI/RI and a plurality of CQIs. In this case, an RU index corresponding to each CQI can be included as well.

Having received the report on the multi-CSI set, the TRP creates and provides RU-specific control information to the vehicle UE in a step 1009.

Figure 11:
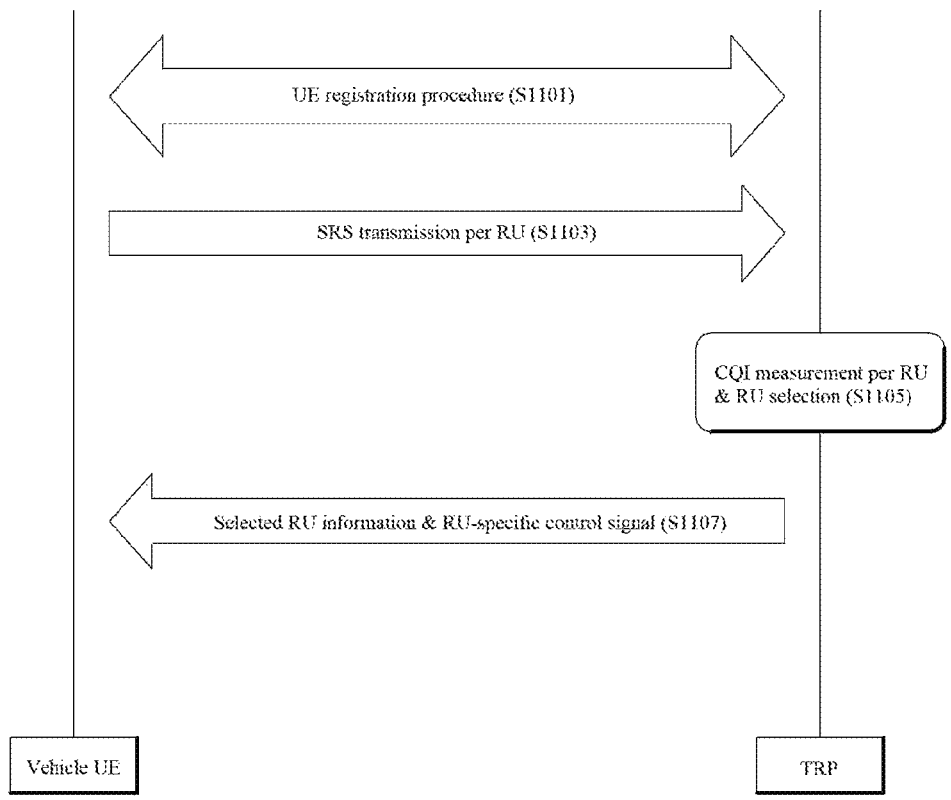
FIG. 11 shows an example that a vehicle UE having a distributed antenna applied thereto reports uplink channel information according to an embodiment of the present invention.

FIG. 11 shows an example that a vehicle UE having a distributed antenna applied thereto reports uplink channel information according to an embodiment of the present invention.

Referring to FIG. 11, in a step 1101, a vehicle UE and a Transmission and Reception Point (TRP), i.e., a base station perform a UE registration procedure. Like FIG. 10, through the UE registration procedure after the setup of connection with the TRP, the vehicle UE can provide the TRP with information indicating that the vehicle UE is a distributed multi-antenna UE and multi-antenna configuration information (e.g., number of RUs, per-RU antenna port configuration, number of antennas per RU, RU index, etc.).

Subsequently, in a step 1103, the vehicle UE transmits a Sounding Reference Signal (SRS) per RU to the TRP. Having received the SRS, the TRP measures CQI per RU and selects one or more RUs to perform uplink communication in a step 1105.

Finally, in a step 1105, the TRP provides the vehicle UE with information on the selected RU (e.g., index information of the selected RU) and RU-specific control information such as an uplink grant for the corresponding RU, thereby performing uplink communication.

The description of the present invention is made with reference to the distributed antenna based vehicle communication, by which the present invention is non-limited. And, the present invention is applicable to a general multi-user multi-antenna system in the same manner.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the aforementioned method of reporting channel quality information in a distributed antenna communication system and apparatus therefor are described by focusing on examples applying to the 3GPP LTE system, they are applicable to various wireless communication systems as well as to the 3GPP LTE system.

What is claimed is:

1. A method of reporting channel status information to a base station by a user equipment having distributed antenna units in a wireless communication system, the method comprising:
   receiving a reference signal from the base station;
   reporting multi-channel status information based on the reference signal; and
   receiving distributed antenna unit-specific downlink resource allocation information from the base station,
   wherein the multi-channel status information includes channel quality indicators for the distributed antenna units,
   wherein the multi-channel status information further includes a rank indicator and a precoding matrix index which correspond to a minimum value of the channel quality indicators, and
   wherein the distributed antenna unit-specific downlink resource allocation information includes a modulation and coding scheme (MCS) level determined based on the minimum value of the channel quality indicators.

2. The method of claim 1, further comprising transmitting information on distributed antenna unit indexes to the base station.

3. The method of claim 2, wherein the multi-channel status information further includes the distributed antenna unit indexes corresponding to the channel quality indicators.

4. A user equipment in a wireless communication system, the user equipment comprising:
   a plurality of distributed antenna units; and
   a processor configured to control the distributed antenna units,
   wherein the processor is further configured to generate and report multi-channel status information to the base station based on a reference signal received from the base station and to receive distributed antenna unit-specific downlink resource allocation information from the base station,
   wherein the multi-channel status information includes channel quality indicators for the distributed antenna units,
   wherein the multi-channel status information further includes a rank indicator and a precoding matrix index which correspond to a minimum value of the channel quality indicators, and
   wherein the distributed antenna unit-specific downlink resource allocation information includes a modulation and coding scheme (MCS) level determined based on the minimum value of the channel quality indicators.

5. The user equipment of claim 4, wherein the multi-channel status information further includes distributed antenna unit indexes corresponding to the channel quality indicators.

* * * * *